UNITED STATES PATENT OFFICE.

EDWARD O. BENJAMIN, OF NEWARK, NEW JERSEY.

GASKET, PACKING, ETC.

1,409,276. Specification of Letters Patent. Patented Mar. 14, 1922.

No Drawing. Application filed July 1, 1918, Serial No. 242,972. Renewed July 28, 1921. Serial No. 488,152.

*To all whom it may concern:*

Be it known that I, EDWARD O. BENJAMIN, a citizen of the United States, and resident of Newark, in the county of Essex and State of New Jersey, have invented certain new and useful Improvements in Gaskets, Packing, Etc., of which the following is a specification.

My invention relates to devices of the above type which contain rubber and which have those qualities of rubber which are desirable for such purposes without having those which are undesirable. It concerns more particularly the physical, chemical and electrical qualities of the article, these being more or less independent of whether the article is molded, pressed or rolled in final form, or in sheets or masses from which the article may be subsequently shaped.

My specific purpose has been to produce various kinds of gaskets and packing especially suited for use on steam boilers, pipes, fittings and engines, but the novel features herein set forth may be embodied in many other forms and may be used for any purpose where any of the special qualities of the material may be found necessary or desirable.

My present invention includes some of the specific results from my discoveries of how to effect various combinations of rubber or its equivalent with phenol-formaldehyde condensation products or their equivalents, in the presence of and probably in combination with some percentages of sulphur or its equivalent, and also from my discovery of how to do this in such manner as to successfully incorporate, physically hold together, and chemically protect considerable quantities of filler.

According to present practice, the hardening of rubber for such purposes is more usually accomplished by partial vulcanizing, usually by the addition of sulphur or other polymerizing agent, and the application of heat, the degree of hardening and other physical qualities of the product being dependent within limits upon the amount of sulphur employed and the degree and duration of the heat applied.

As explained in my companion applications, particularly Serial Number 242,047, filed June 26th, 1918, the difficulty with ordinary vulcanizing is that the rubber product is never really stable until vulcanization has been carried to its limit, as for instance, in the production of what is known as "hard rubber" or "ebonite." Products in any of the intermediate stages or degrees of vulcanization have an affinity for a large number of very common reagents to which they are ordinarily exposed by the conditions of use. Almost without exception, these reagents are destructive, tending to change the product either toward the brittle or frail condition when the reaction is oxidizing or dehydrating and toward the plastic or liquefied condition when the reaction is reducing or hydrogenating. In either case the elasticity and tensile strength are destroyed and the material rendered useless for most of the purposes for which it is commonly employed.

My method, broadly stated, contemplates employing sufficient vulcanizing agent to induce the active affinity stage but not sufficient to satisfy it, and simultaneously supplying to the rubber some other substance which while satisfying these undesirable affinities, will not destroy the desirable physical qualities and which may in certain cases improve certain qualities or introduce new qualities.

My discovery of the generic scope and also the limitations of my said method has involved discovering many new specific products. A great variety of these are described in one of said companion applications in which I have made broad claims covering the generic features of my new processes and products; also specific claims for the rigid products and still more specific claims for the rigid products when made of high insulating quality. A second companion application which is a division of said application contains broad claims for the softer products which I have discovered, particularly tough pliable products, and the more specific claims thereof are limited to products in which a binder constituent gives a toughness and pliability adapting the products for special purposes as for instance, leather substitutes, especially when organic fibrous fillers are employed.

The novel products constituting my present inventions are included in the comprehensive disclosures of said other applications but are specifically claimed only in this application. They result from my discovery that they can be produced and my success in practically demonstrating what modifications must be made and what limits must be imposed in order to successfully produce them.

My present invention involves the discovery that rubber, sulphur, condensation product and filling material can be compounded in proper proportions and properly treated so as to make gaskets and packing of the proper degree of moldability and resilience for making perfectly tight joints and which will not distort, flow or break when subjected to the heat, pressure and chemical action of live steam and which will not shrink, crack or disintegrate when subjected to such action for long periods of time.

I have also discovered that the proportion of sulphur used, and the proportion remaining uncombined in the product, may be made so small that the sulphur will not attack or be attacked by the metals with which the gasket or packing is brought in contact.

I have also discovered that the sulphur, condensation product and rubber can be associated in such proportions and under such conditions that the material will be substantially proof against physical, chemical, solvent or electrolytic reactions of the steam, air, oil, sulphur and metal such as deteriorate and destroy rubber gaskets commonly used for such purposes. This also makes it possible to avoid chemical reaction and cohesion of the gasket with metal surfaces of the joint, such as commonly result in injury to such surfaces as well as delay and unnecessary labor when inspection or repairs of the apparatus are required.

The rubber, condensation product and sulphur constituents are non-conducting but I have discovered that these can be associated with each other and with desired percentages of heat-conducting metallic filler, or lubricating graphite without introducing any substances which would destroy the physically and chemically resistant qualities of the product.

Pursuant to the broad principles set forth in my said generic application above referred to, the condensation product, rubber and sulphur are associated in a special way so that the sulphur is kept in intimate mixture with the rubber and the condensation product is diffused so as to avoid excessive concentration thereof at any point in the mixture.

This may be accomplished by methods involving the use of liquid solvents, as described in my said application, but for my present purpose, I prefer the milling, rolling and folding method.

According to this method the condensation product in a primary or soluble state is first spread out by film-coating it upon a suitable quantity of inert material. The rubber is separately mixed with the sulphur very thoroughly, preferably by milling. The coated material in dry form is then intimately mixed with the rubber-sulphur mixture to form a binding material. This binding material is then thoroughly mixed with a suitable quantity of inert filler preferably by repeated rolling and folding operations. The resulting homogeneous mixture may be molded into any desired form and the molded article may be heated under a pressure to a temperature and for a time necessary to produce the desired reaction and combination of the materials. These will vary somewhat according to the proportions of the several ingredients.

The condensation product may be one derived by reaction of phenol or its homologues with formaldehyde or its polymers or hydrates, but I prefer the cresol-formaldehyde condensation product. The condensation product is used in one of its primary states before reaching the final infusible, insoluble state.

The inert material, the particles of which are to form the nuclei for the coating may be asbestos, mica, talc or similar material but for steam gaskets and packing, I prefer asbestos. Various kinds of rubber, balata or gutta-percha may be employed but for my purpose, I prefer commercial Para rubber or Ceylon rubber containing less than 3% of resin.

The additional filling material will consist partly of heat resisting material such as asbestos, mica or talc, etc., and partly of one or more special materials such as graphite for lubrication, aluminum powder for heat conductivity, etc.

For the coated material, I prefer the proportion of about $2\frac{1}{4}$ to $2\frac{1}{2}$ parts asbestos for one part condensation product.

The proportions of condensation product to rubber and of rubber to sulphur are selected with a view to getting good binding quality combined with the chemical inertness. To this end, I employ between 8% to 11% of condensation product for 92% to 89% of rubber.

The sulphur to be separately mixed with the rubber should be just enough to combine with the rubber and that in any event the sulphur remaining uncombined in the finished product shoud not exceed 1%. To this end and for my present purpose, I prefer that the sulphur should be less than 2% of the total product and not much over 6% of the rubber-sulphur mixture. The larger percentages of sulphur shorten the time of heating necessary to complete the reaction and give a somewhat harder product. Increasing sulphur much beyond 5% of the rubber-sulphur will make the material less stable and more likely to become brittle with use or lapse of time.

The binder product above described is mixed with the filler in the desired proportions, which may vary from say 10% to 15% of binder for the non-combustible, high temperature products up to say 30% to 40% for the softer more moldable products, the total mica, talc, asbestos, graphite, aluminum, etc. used as additional filler, taken with the asbestos used as nuclei, being thus approximately 60% to 90% of the total binder and filler.

Illustrative examples of three complete formulæ for pliable products suitable for steam packing and similar purposes, are combined in the following table in which the first column illustrates the use of powdered graphite; and the last two the use of powdered aluminum, as substitutes for part of the filler. The third column also illustrates how the rubber-sulphur percentage may be decreased and red lead introduced for high temperature steam packing.

|  |  | With graphite. | With aluminum. | Non-combustible. |
|---|---|---|---|---|
| Rubber-sulphur.. | Rubber | 22.0% | 22.0% | 11.0% |
|  | Sulphur | 1.0% | 1.0% | 0.5% |
| Condensation product | Condensation product | 2.5% | 2.5% | 1.2% |
|  | Nuclei asbestos | 5.8% | 5.8% | 2.9% |
| Filler | Mica | 54.0% | 45.0% | 12.0% |
|  | Asbestos |  | 10.0% | 55.5% |
|  | Graphite | 8.7% | 0.2% |  |
|  | Aluminum |  | 7.5% | 6.4% |
| Accelerator | Litharge | 6.0% | 6.0% | 8.0% |
|  | Red lead |  |  | 2.5% |

The "graphite" formula in the first column gives a pliable, resiliently compressible, more or less tough product, suitable for steam packing and similar purposes. The graphite is employed for its slippery, lubricating quality which in the final product, has the effect of preventing adhesion of the material of the gaskets or packing to the clamping surfaces under the pressure and heat to which they are subjected when employed for steam packing. The amount of graphite thus employed to impart non-stick or lubricating qualities to the product, may be varied considerably from the 8.7% given in the formula, subject to the condition that the product begins to become less tough where even 3% to 5% of graphite is used and not more than 10% or 15% can be employed without reducing the toughness below what is desirable for steam gaskets as ordinarily used.

For special purposes, however, such as lubricating rings for piston rods of steam engines, where tensile strength is not required and where high lubricating quality combined with slight moldability to take up for wear are required, the graphite may be increased up to 40% or 50% or more of the total mixture. In such case, the graphite will take the place of the other fillers so that where 50% of graphite is used, the remaining 50% will be substantially all rubber-sulphur-condensation product. Also in such cases, graphite may be substituted for asbestos as the nuclei on which the condensation product is coated.

The "aluminum" formula in the second column of the above table, gives a product which is somewhat like that of the first column in that it is pliable, resiliently compressible and more or less tough. The aluminum is employed primarily for its heat conducting quality but also because it is chemically inert, light in weight, commercially available as a very fine powder, etc. It renders the product particularly adapted for use where the temperatures of the clamping surfaces are likely to be high, thus making a certain amount of heat conductivity necessary in order to properly diffuse the heat, particularly on occasions when the heat is suddenly applied. The aluminum adds a certain degree of non-stick or lubricating quality to the product and hence the graphite is greatly reduced or may be entirely omitted. For a similar reason, the amount of aluminum employed to give heat conductivity, while capable of considerable variation from the 7.5% given in the formula, must be limited by the condition that the product begins to become less tough where 5% to 10% of aluminum is used and not more than 20% to 25% can be employed without reducing the toughness below what is desirable for steam gaskets as ordinarily used.

In both of the above formulæ, a considerable percentage of accelerating material such as litharge, may be employed. The litharge, however, has special chemical affinities and functions with reference to the sulphur and rubber which make it undesirable to employ it in amounts greater than 5% to 10% of the total mixture, or greater than 20% to 30% of the rubber constituent of the binder.

The formula for "non-combustible" material in the third column of the table, gives a product which contains only half as much rubber-condensation product as the formulæ of the first and second columns. The material is correspondingly harder and less tough at normal temperatures. When used at high temperatures, however, it becomes more moldable and tougher without becoming soft and it has the advantage that it is non-combustible and will not melt or disintegrate under any heat likely to be applied to it even when used on high pressure steam apparatus. The non-combustible quality makes it more desirable than other rubber compounds, when used in situations where there is danger of fire, especially where burning of the packing would introduce additional danger, as for instance, through the escape of compressed steam or other gases.

The asbestos, 55.5% with the mica, 12%, constitute more than ⅔ of the material. Both of them are non-combustible refractory minerals. The asbestos is also fibrous in its nature and contributes to the structural strength of the product. The 6.4% aluminum powder affords the desired degree of heat conductivity. The 8% of litharge used as accelerator insures quick and complete reaction of the rubber-sulphur-condensation product.

The 2.5% of red lead improves the texture of the material and is a desirable constituent where the material is to be used in the form of gaskets or packing in contact with iron.

For any of these products the steps to be followed are more or less similar. The condensation product, in one of its primary states, is first thoroughly mixed with and coated on to the nuclei, preferably short fiber asbestos and then spread out and allowed to harden without however changing it over to the final insoluble, infusible form. It is then comminuted or pulverized in any suitable way.

By a separate process the rubber and sulphur are molded together into intimate mixture, preferably by repeated folding and passing through warm rolls (preferably about 100° F.) until the sulphur becomes invisible in the rubber.

The coated material in a dry state is incorporated into the rubber-sulphur mixture preferably by rolling and folding together until no layers or surfaces of separation appear and the mass is of uniform color and consistency throughout.

The litharge or other accelerator material is then thoroughly worked in by similar rolling and folding process.

The resulting binding material is relatively soft and moldable and the filler is incorporated gradually while the material is being repeatedly rolled, folded and re-rolled. This process is repeated with each filler material until the product becomes perfectly homogeneous and of uniform color throughout.

The order in which the materials are thus separately incorporated is important. Graphite being the most slippery and adhering least readily to the binding material, should be incorporated last. For a similar reason, the aluminum should be last where graphite is not used and next to last where graphite is used. Similarly, asbestos should be incorporated before mica.

The resulting homogeneous mixture may be worked into the required shape and applied in the raw condition as a gasket or packing for any steam or other hot apparatus where the conditions of use will permit its being heated up to the required temperature before being subject to excessive steam pressures.

Preferably, however, the article worked into the proper size and shape is put in a mold and subjected to hydraulic pressure of say 2000 pounds per square inch, the mold being heated preferably by steam at about 21 pounds pressure, that is to say, preferably about 260° Fahrenheit.

The heat of the mold may be varied considerably but too little heat will make the reaction slow or incomplete while too much heat too suddenly applied may make the product too hard or brittle and excessive heat may burn the rubber.

Where the condensation product is derived from commercial cresols, the reaction will begin somewhat below 260° Fahrenheit, and will be completed at temperatures somewhat higher, probably because commercial cresol is usually a mixture of ortho, meta and para-cresol but, for phenol condensation product the temperature is more definite and the reaction more sudden when that temperature is reached. For my rigid products the heat may be raised considerably beyond the critical temperature required for the reaction, that is to say to 290° or 300° F.

The closeness of grain of the product will be governed to a certain extent by the amount of the pressure exerted upon the material in the mold, the grain being closer where great pressure is used.

When the above specified heat and pressure are employed, the mold may be brought to heat in about 3 or 4 minutes and this heat and pressure is continued for a sufficient time to complete the reaction. Say twenty minutes to half an hour on the average, will be sufficient. The material expands slightly while the reaction resulting in combination of the condensation product with the rubber is taking place and the process will be complete a short time after the material has ceased to expand.

The completeness of the reaction may be determined by the disappearance of the antiseptic odor characteristic of the condensation products and by the change in appearance and color of the material, these being quite marked and easily recognized in practice but not so easy to describe. In general, it may be said that where no coloring matter or graphite is used, the raw material approximates a reddish brown while the finished product is more nearly an olive gray and the presence of coloring matter will vary this in various ways.

Composite products suitable for various purposes may be produced by combining different mixtures or by varying the proportions of binder or sulphur in different parts of the same article, as for instance, a layer of mixture giving a softer product may be rolled or otherwise combined with a layer of mixture giving a harder product, or the surface of an article or sheet may be treated to increase the percentage of sulphur or to apply a modified binder.

In the above products, I have succeeded in combining the advantages of chemical stability attainable by full vulcanization with sulphur as in hard rubber or ebonite, together with the physical qualities desirable for gaskets and packings of this class.

From the foregoing explanation of the chemical and physical results which I obtain, it will be evident that the term "condensation" product is employed herein merely as a convenient way of identifying a certain class of compounds having the above described peculiar chemical properties and reactions with reference to sulphur and rubber molecules in the presence of heat. Except where otherwise indicated, the expression "phenol" or "phenolic condensation product" is used in a generic sense and is intended to include phenol, cresols, zylenol condensation products or their equivalents. The word "condensation" is used for such identification merely because in present commercial practice most of the compounds suitable for my purpose are obtainable by condensation through catalytic action.

While I have given illustrative examples of the inert materials, condensation product and binders which may be employed and also an illustrative formula showing constituent materials and their percentages, calculated to produce a very desirable embodiment of my invention, it will be evident from the foregoing that various omissions and substitutions of constituent materials, as well as various changes in the proportions may be made without departing from the spirit of my invention.

I claim:

1. A resiliently compressible tough, stable, non-sticking gasket or packing material consisting of non-combustible, wholly mineral filler including a lubricating material, held and protected by rubber united with phenolic condensation product in the presence of sulphur, by heat and pressure applied while the condensation product is in primary soluble state, the completed material containing less than 1% of uncombined sulphur.

2. A resiliently compressible tough, stable, heat-conducting gasket or packing material consisting of non-combustible wholly mineral filler including graphite material, held and protected by rubber united with phenolic condensation product in the presence of sulphur, by heat and pressure applied while the condensation product is in primary soluble state, said sulphur being less than 5% of the rubber-sulphur; said condensation product being less than 11% of the combined rubber-condensation product; and said rubber-condensation product being more than 20% of the whole.

3. A resiliently compressible tough, stable, heat-conducting, non-sticking gasket or packing material consisting of non-combustible, wholly mineral filler including aluminum, held and protected by rubber united with phenolic condensation product in the presence of sulphur, by heat and pressure applied while the condensation product is in primary soluble state, and said sulphur being less than 5% and more than 1% of the rubber-sulphur; said condensation product being less than 11% and more than 8% of the rubber-condensation product; and said rubber-condensation product being less than 40% and more than 20% of the whole.

4. A resiliently compressible tough, stable, heat-conducting, non-sticking gasket or packing material consisting of non-combustible, wholly mineral filling material, including powdered aluminum and graphite, held and protected by rubber united with phenolic condensation product in the presence of sulphur, by heat and pressure applied while the condensation product is in primary soluble state, and said sulphur being less than 5% and more than 1% of the rubber-sulphur; said condensation product being less than 11% and more than 8% of the rubber-condensation product; and said rubber-condensation product being less than 40% and more than 20% of the whole, the completed material containing less than 1% of uncombined sulphur.

5. As an article of manufacture, a gasket substantially proof against deteriorating by ordinary steam, heat, oils, acids and alkalies, a good heat-conductor, resiliently compressible and moldable so as to form a steam-tight joint where compressed between surfaces of a joint, said gasket comprising a binding material intimately mixed with a filler of asbestos and finely comminuted mica, said binder consisting of finely comminuted asbestos nuclei coated with films of phenolic condensation product in the primary soluble state and intimately mixed with unvulcanized rubber containing 1% to 5% of free sulphur, said mixture being heat-treated to combine the rubber, condensation product and sulphur, to such an extent as to substantially satisfy the chemical affinities of the constituent materials.

Signed at New York city in the county of New York, and State of New York, this 25th day of June, A. D. 1918.

EDWARD O. BENJAMIN.